United States Patent

[11] 3,530,876

[72] Inventor Theodore R. Stoner
     311 Linwood Ave., Stevens Point,
     Wisconsin 54481
[21] Appl. No. 770,624
[22] Filed Oct. 25, 1968
[45] Patented Sept. 29, 1970

[54] CONTROL VALVE FOR BRINE TANK OF WATER SOFTENER
     8 Claims, 4 Drawing Figs.
[52] U.S. Cl. .................................................. 137/399,
     137/192, 137/432, 210/126
[51] Int. Cl. ........................................................ B01j 1/04,
     G05d 9/00
[50] Field of Search ............................................. 137/101.25,
     101.27, 192, 386, 396—399, 429—433, 441;
     210/126; 73/322.5

[56]          References Cited
          UNITED STATES PATENTS
1,227,539  5/1917  Illsley ............................. 137/432

2,613,922  10/1952  Gatchet ............................ 137/192
2,680,715  6/1954  Cook ............................... 73/322.5X
3,295,549  1/1967  Buchmann ......................... 137/391

Primary Examiner—William F. O'Dea
Assistant Examiner—David R. Matthews
Attorney—Wheeler, Wheeler, House and Clemency ABSTRACT: This disclosure relates to apparatus for controlling liquid flow into and out of the brine tank of a water softener. The liquid pipe through which fresh water is admitted to the tank and brine is withdrawn from the tank terminates in a valve plug spaced substantially above the tank bottom. The valve comprises a vertically elongated, vertically movable valve chamber which surrounds the valve plug and has top and bottom valve seats which cooperate with the plug to shut off liquid flow through the pipe. The chamber has a float to cause it to rise and fall with the level of the liquid in the tank. The chamber has an opening near its bottom in communication with the liquid in the tank.

Patented Sept. 29, 1970

3,530,876

INVENTOR
THEODORE R. STONER

BY Wheeler, Wheeler, House & Clemency
ATTORNEYS

CONTROL VALVE FOR BRINE TANK OF WATER SOFTENER

BACKGROUND OF THE INVENTION

Control valves used in brine tanks of water softeners conventionally incorporate complicated linkage systems. The control valve of the present invention is much simpler and less likely to get out of order. Valving action involves only the vertical movement of a float-supported valve chamber.

SUMMARY OF THE INVENTION

The control valve of the present invention functions on the basis of the rise and fall of a float-supported valve chamber which has at its top and bottom valve seats which respectively cooperate with a valve plug on the end of a liquid pipe which is located within the valve chamber and between said seats. As liquid in the tank rises, the bottom in the float-supported valve chamber will close against the valve plug on the end of the pipe and shut off flow of liquid into the tank. As liquid is withdrawn from the tank, the float-supported valve chamber will fall until the top valve seat closes against the valve plug on the end of the pipe, thus terminating withdrawal of liquid from the tank.

The valve chamber functions as a conduit for maintaining flow of liquid between the pipe and the tank when the liquid within the tank is at a level lower than the end of the pipe.

Other objects, features, and advantages of the invention will appear from the following disclosure.

DESCRIPTION OF PREFERRED EMBODIMENT

Figure 1:
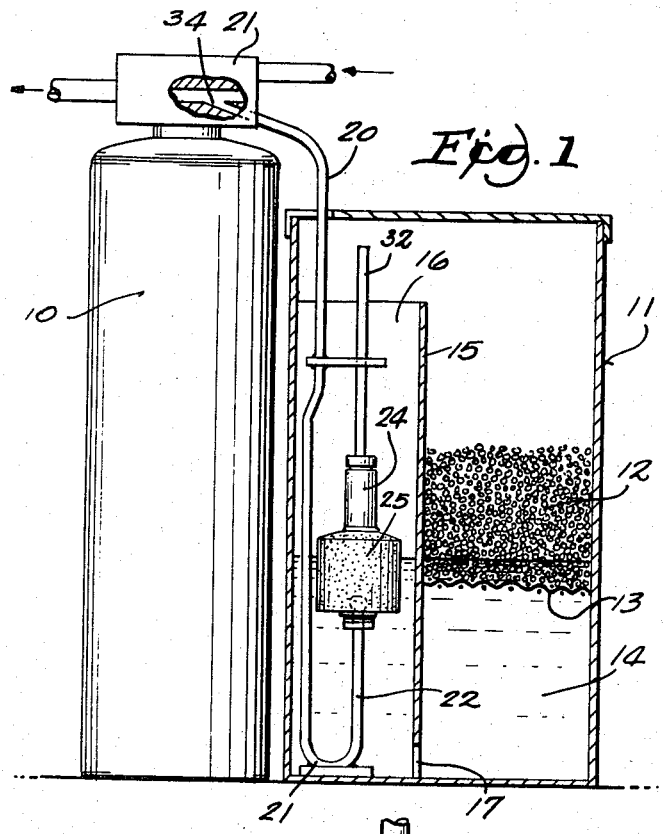
FIG. 1 is a vertical cross section through a brine tank and control valve embodying the invention, the brine level being at its uppermost level.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Like parts are given the same reference characters in the several views.

A typical water softener tank 10 carries an ion exchange chemical such as zeolite which removes calcium from the water and replaces it with sodium, thus to soften water. At one side of the tank is a brine or salt tank 11 which contains a bed of salt 12 above a perforated plate or screen 13. Below the screen 13 is a brine sump 14. There is a vertical partition 15 within the tank 11 which defines a control valve well 16 which is open to the sump 14 through the port 17.

Figure 2:
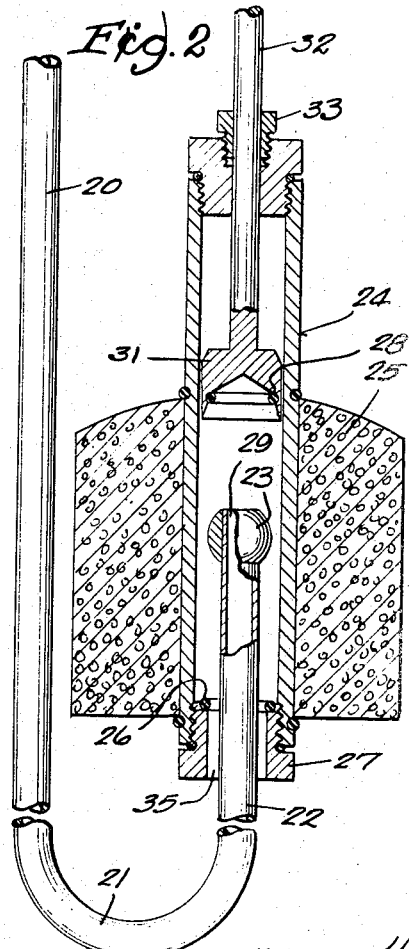
FIG. 2 is an enlarged cross section through the control valve of FIG. 1.
Figure 4:
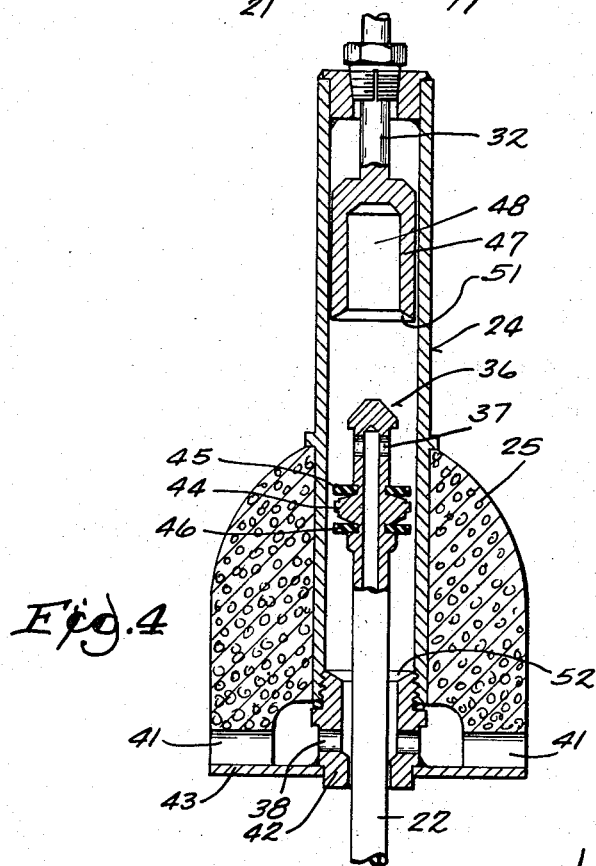
FIG. 4 is a cross section taken through a modified embodiment of control valve.

The well 16 houses the control valve, one form of which is shown in FIG. 2, and another form of which is shown in FIG. 4. A liquid pipe 20 leads from a conventional control valve 21 at the top of the water softener tank into the well 16. Liquid pipe 20 has a U-shaped bottom bend 21 with an upwardly extending pipe stem or leg 22. In the embodiment of FIG. 2, stem 22 terminates in a ball-shaped valve plug 23 through which the stem 22 has an axial port 29.

Surrounding the valve plug 23 is a vertically elongated, vertically movable cylindrical valve chamber 24. Chamber 24 is provided around its outside periphery with a float 25. Accordingly, the float 25 and the chamber 24 ride up and down with the level of the liquid in the sump 14.

Near its bottom the valve chamber 24 has an O-ring pressure shutoff seat or seal 26 which is carried on a threaded plug 27 which is screwed into corresponding threads at the bottom of the chamber 24. Plug 27 is provided with an opening 35 for flow of liquid between the interior of chamber 24 and the sump 14. Near its top the chamber 24 carries another O-ring shutoff seat or seal 28 mounted on a movable carrier 31 having a stem 32 by which the carrier can be vertically adjusted. The adjusted position of the seal 28 can be locked by the lock nut 33.

In operation, when the zeolite or other water softening chemical in the tank 10 is ready to be recharged, the valve 21 is actuated to supply fresh water to the tank 10 through a venturi 34. As this water flows into the tank 10, it will impose suction on the line 20 to draw brine from the sump 14. Note that the upper level of the brine in sump 20, as shown in FIG. 1, is somewhat above the plate 13. Accordingly, there is ample opportunity for the water in the sump 14 to become saturated with salt. As the brine flows into tank 10 and around the zeolite, there will be an exchange of sodium for calcium, thus to recharge the zeolite.

Figure 3:
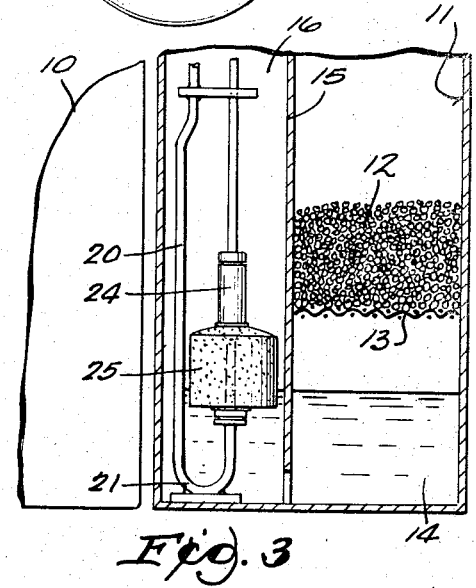
FIG. 3 is a view similar to FIG. 1 but showing the brine at a lower level than in FIG. 1.

Brine flows from sump 14 through opening 35 and the interior of chamber 24 to the valve plug 23, port 29, and thence through pipe 20 to the tank 10. The float 25 will fall as the brine level drops in the sump 14. Even when the brine level drops below the level of the ball 23, as shown in FIG. 3, the valve chamber 24 remains full of liquid and functions as a conduit through which the brine will be withdrawn from the tank. Flow of brine continues until the valve chamber 24 has descended to a level where the top O-ring 28 engages with the ball valve 23, thus shutting off the flow of brine into the line 20. At this point of the cycle the brine level will be very low in the tank 11, as shown in FIG. 3.

Accordingly, no more brine will be added to the water softening tank 10. Fresh water continues to flow into the softener tank 10, thus to flush the brine into the sewer. After flow continues for such a period of time that the brine has been flushed out of tank 10, valve 21 is actuated to reverse the flow of water and to pressurize the line 20 to refill the brine tank 11 with fresh water. Accordingly, fresh water will now enter the brine tank 11 through the line 20, the ball port 23, the interior of chamber 24 and opening 35 into the sump 14. As the liquid level in the brine tank 11 rises, the float 25 and chamber 24 will also rise until the bottom pressure shutoff seal 26 engages the undersurface of the ball 23, thus closing off admission of additional water into the tank 11. At this point the level of liquid in the sump 14 will be a few inches above the plate or screen 13, as shown in FIG. 1. Valve 21 will now be actuated to restore normal operation to the softener.

After a period of time the water in the brine tank 11 will pick up a salt load through convection, thus to be in readiness for the next recharging cycle of the apparatus.

FIG. 4 shows a modified embodiment of the control valve. The valve plug and top and bottom seats on the valve chamber 24 are specifically different from the corresponding parts in the embodiment of FIG. 2. The valve plug 36 on the upper end of the pipe stem 22 has lateral ports 37 by which water entering the chamber 24 flows transversely to the longitudinal dimension of chamber 24 and transversely to its vertical direction of movement. Accordingly, there is no water jetting action in the direction of valve chamber movement, thus to avoid any problem of dislodging the valve with respect to its proper position as established by float 25.

Moreover, the openings 38 formed in the threaded plug 42 at the bottom of chamber 24 are also disposed laterally with respect to the longitudinal axis of the chamber 24 and its direction of movement. Accordingly, water flowing from the chamber 24 into sump 14 has no axial component of force which would dislocate the axial position of the chamber. Accordingly, the jet action of water flowing into the tank 11 is neutralized.

In the FIG. 4 embodiment the float 25 is also provided with lateral discharge ducts 41 which align with the lateral ports 38 in the bottom plug 42. The base of the float 25 is provided with a transverse baffle 43 which channels the water flow.

The seals for the plug 36 and the top and bottom chamber seals are also modified in this embodiment, as compared to those shown in FIG. 2. There is a knob 44 short of the end of pipe stem 22. There are rubber or similar elastomeric flexible sealing flaps 45, 46 respectively above and below the knob 44. Stem 32 is provided with a valve seat carrier 47 which has a recessed chamber 48 into which the valve plug 36 is received. The bottom of carrier 47 is tapered or beveled at 51 to function as a seat against which the top rubber gasket 45 fits to close off flow of brine from the tank when the float reaches its lowermost position.

In like manner as the float rises during admission of fresh water into the tank 11, the beveled or tapered seat 52 on the top of bottom chamber plug 42 will seal against the bottom sealing flap 46 to shut off flow of liquid into the tank when the liquid level and float have reached their uppermost position.

The stem 32 is adjustable vertically in the chamber to adjust the amount of brine which will be withdrawn from sump 14 in each recharging cycle. If the stem is lifted upwardly, this will increase the brine charge. If the stem is pushed into the chamber 24, this will decrease the brine charge.

I claim:

1. An apparatus for controlling liquid flow into and out of the brine tank of a water softener, said apparatus including a liquid pipe through which fresh water is admitted to the tank and brine is withdrawn therefrom, and a valve for opening and closing said pipe, the improvement in said valve in which:

said pipe terminates in said tank in a valve plug spaced substantially above the tank bottom;

said valve comprises a vertically elongated, vertically movable valve chamber about said valve plug and having near its top a top valve seat which cooperates with the plug to shut off liquid flow through the pipe when the valve chamber moves downwardly to engage the top seat with the plug and having near its bottom a bottom valve seat which cooperates with the plug to shut off liquid flow through the pipe when the valve chamber moves upwardly to engage the bottom seat with the plug;

a float on the valve chamber to cause it to rise and fall with the level of the liquid in the tank; and said valve chamber having an opening near its bottom in communication with the liquid in the tank in all positions of the chamber.

2. The improvement of claim 1 in which said valve plug is above the liquid level in the tank when the valve chamber falls to a low level, the space within the chamber acting as a conduit for flow of liquid between the pipe and the tank.

3. The improvement of claim 1 in which said plug has side orifices through which liquid flows from the pipe in a direction transverse to the elongation of the valve chamber, thus to avoid jet action which would tend to displace the valve chamber vertically.

4. The improvement of claim 1 in which the opening near the bottom of the chamber directs liquid transversely to the elongation of the valve chamber, thus to avoid jet action which would tend to displace the valve chamber vertically.

5. The improvement of claim 4 in which there is a transverse baffle on said valve chamber beneath said opening.

6. The improvement of claim 1 in which said plug comprises a ball having rounded upper and lower faces which cooperate with said top and bottom seats.

7. the improvement of claim 1 in which said plug is provided with flexible flaps which cooperate with said top and bottom seats.

8. The improvement of claim 1 in which one of said seats is adjustable vertically with respect to the valve chamber, thus to adjust the volume of liquid withdrawn from the tank.